(12) United States Patent
Niesten (10) Patent No.: US 8,294,993 B2
(45) Date of Patent: Oct. 23, 2012

(54) VARIABLE REFLECTIVITY NOTCH FILTER AND OPTICAL DEVICES USING SAME

(75) Inventor: Maarten Niesten, Kirkland, WA (US)

(73) Assignee: Microvision, Inc., Remond, WA (US)

( * ) Notice: Subject to any disclaimer, the term of this patent is extended or adjusted under 35 U.S.C. 154(b) by 276 days.

(21) Appl. No.: 12/843,424

(22) Filed: Jul. 26, 2010

(65) Prior Publication Data

US 2012/0019923 A1    Jan. 26, 2012

(51) Int. Cl.
*G02B 27/14* (2006.01)
*G02B 5/28* (2006.01)

(52) U.S. Cl. .................. 359/630; 359/634; 359/589

(58) Field of Classification Search .......... 359/627, 359/630, 631, 634, 636, 359, 583, 584, 589; 345/7–9
See application file for complete search history.

(56) References Cited

U.S. PATENT DOCUMENTS

| | | | |
|---|---|---|---|
| 3,807,849 A | 4/1974 | Lobb | |
| 4,634,220 A | 1/1987 | Hockert et al. | |
| 5,625,493 A | 4/1997 | Matsumura et al. | |
| 6,043,937 A | 3/2000 | Hudson et al. | |
| 6,236,511 B1 | 5/2001 | Brown | |
| 6,565,982 B1 * | 5/2003 | Ouderkirk et al. | 428/457 |
| RE38,245 E | 9/2003 | Morris et al. | |
| 2004/0135742 A1 | 7/2004 | Weber et al. | |
| 2004/0196438 A1 | 10/2004 | Togino | |
| 2006/0098272 A1 | 5/2006 | Lerner et al. | |
| 2006/0221022 A1 | 10/2006 | Hajjar | |
| 2007/0103747 A1 | 5/2007 | Powell et al. | |
| 2008/0218822 A1 * | 9/2008 | Powell et al. | 359/197 |
| 2009/0059336 A1 | 3/2009 | Dunphy et al. | |
| 2010/0149483 A1 | 6/2010 | Chiavetta | |

FOREIGN PATENT DOCUMENTS

| | | |
|---|---|---|
| EP | 0151703 | 8/1985 |
| EP | 0463888 | 1/1992 |
| WO | WO8903059 | 4/1989 |

* cited by examiner

*Primary Examiner* — Alicia M Harrington
(74) *Attorney, Agent, or Firm* — Kevin D. Wills (57) ABSTRACT

A variable reflectivity notch filter (100), suitable for use with a laser image projection source (1001) is provided. The variable reflectivity notch filter (100) defines a transmission curve (101) having a plurality of reflective peaks (102,103,104) each centered about a predetermined wavelength (105,106, 107), which can correspond to output wavelengths from laser sources. Reflective peaks (204) corresponding to wavelengths that change with temperature are configured with wider widths (223) and lesser reflectivities (210) than are other reflective peaks (202,203). To provide enhanced color balance, lasers (821) corresponding to these reflective peaks (204) can be driven at higher output power. Variable reflectivity notch filters (100) are suitable for use in head-up displays as well as other applications.

6 Claims, 8 Drawing Sheets

VARIABLE REFLECTIVITY NOTCH FILTER AND OPTICAL DEVICES USING SAME

CROSS REFERENCE TO PRIOR APPLICATIONS

This application is related to commonly assigned U.S. patent application Ser. No. 12/424,129, filed Apr. 15, 2009 and entitled "Wide Field of View Head-Up Display System." This application is related to commonly assigned U.S. Pat. No. 7,715,103, filed Sep. 10, 2007 and entitled "Buried Numerical Aperture Expander Having Transparent Properties." This application is related to commonly assigned U.S. Pat. No. 7,656,585, filed Aug. 19, 2008 and entitled "Embedded Relay Lens for Head-Up Displays or the Like."

BACKGROUND

1. Technical Field

This invention relates generally to optical filters and associated systems, and more particularly to a variable reflectance notch filter and laser-based image projection systems employing the same.

2. Background Art

Laser projection devices facilitate the production of brilliant images created with vibrant colors. Laser projection systems are generally brighter, sharper, and have a larger depth of focus than do conventional projection systems. Further, the advent of semiconductor lasers and laser diodes allows laser projection systems to be designed as compact projection systems that can be manufactured at a reasonable cost. These systems consume small amounts of power yet deliver bright, complex images.

For the reasons set forth above, lasers are frequently used in sophisticated projection systems such as head-up displays. In a head-up display, lasers present information to a user along a projection surface that is semi-transparent. The user may accordingly see the information without having to move their eyes from their primary viewing position to read the information. Once only available in expensive systems such as military aircraft, head-up systems are now becoming commercially available to consumers as well.

One issue making the incorporation of laser projection systems into some applications is temperature. Illustrating by way of example, it would be desirable to incorporate a head-up system into a vehicle so that the user may see information without having to divert their eyes from the road. However, in automotive applications the temperature within an automobile can vary by more than one hundred degrees Celsius. While prior art systems provide adequate performance within a narrow temperature range, performance can be compromised at temperature extremes due to the changes in emitted wavelength across temperature.

There is thus a need for an improved projection system offering improved performance across large temperature ranges.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a variable reflectivity notch filter and an associated projection surface, imaging system, and applications thereof. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the systems and applications set forth below. The non-processor circuits may include, but are not limited to, microprocessors, scanning mirrors, image spatial modulation devices, memory devices, clock circuits, power circuits, and so forth. As such, the functions and operative states shown herein may be interpreted as steps of a method. Alternatively, some or all functions employed by the one or more processors to control the various elements herein, including the spatial light modulator, beam translator, and light translation element, could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention employ a variable reflectivity notch filter that is suitable for use in a translucent projection surface. By incorporating the variable reflectivity notch filter into a translucent projection surface, a high-visibility head-up display that functions well across a wide range of temperatures can be constructed. Head-up display systems in accordance with embodiments of the present invention facilitate vivid head-up images across a wide range of temperatures without obscuring a user's field of view through the projection surface.

One of the challenges in designing laser-based projection systems for automotive and other thermally dynamic environments involves the wide range of temperatures encountered by the system. For example, many automotive systems can experience temperatures that range from −30 degrees centigrade to +85 degrees centigrade or more. Laser sources, such as semiconductor lasers or other similar sources, are configured to emit light having a specific center wavelength. However, as the temperature varies from very cold to very hot and vice versa, the center wavelengths of some of these sources can drift. Some have center wavelengths that can change by tenths of nanometers per degree. Thus, in an automotive application where the temperature can range from −30 degrees centigrade to +85 degrees centigrade, the center wavelength of a given laser source may move nearly 20 nanometers or more.

This presents a problem because laser-scanned head-up displays, such as that disclosed in commonly assigned U.S. Pat. No. 7,715,103, filed Sep. 10, 2007 and entitled "Buried Numerical Aperture Expander Having Transparent Properties," rely upon reflective coatings to provide the head-up display. Said differently, a reflective coating is incorporated into an otherwise transparent display surface and reflects the center wavelengths of the laser sources while allowing other wavelengths to pass through.

When the center wavelength moves dramatically over temperature, the reflective properties must be modified to accommodate the corresponding wavelength shift. The result is that the reflective coating must reflect a wider range of light. This, in turn, means that less light is transmitted through the coating. The overall performance of the system can be compromised when the coating becomes too reflective. Objects viewed through the coating may appear out of color, ill-defined, or out of focus.

Embodiments of the present invention solve this issue with the use of a variable reflectivity notch filter. The variable reflectivity notch filter is designed with different reflectivities for different laser sources. Thus, in one embodiment, a reflectivity associated with a laser source that has a temperature-sensitive center wavelength can be configured to be lower that the reflectivity associated with other sources. Further, the reflective "notch," which is a nomenclature referring to the range of wavelengths reflected by a given reflectivity that is used because of the way the reflectivity appears in a transmission curve, of the laser having the temperature-sensitive center wavelength can be configured to be wider than that associated with other sources so as to reflect that laser's light across a desired range of temperatures. The result of the lower-reflectivity, wider reflective peak is a reflective filter that is configured to reflect the temperature sensitive source across a greater temperature range without significantly increasing the overall reflectivity of the layer. By increasing the output power of the temperature sensitive sources, a bright, color-balanced, vivid image can be projected without impeding a viewer's ability to see objects beyond the projection surface.

Figure 1:
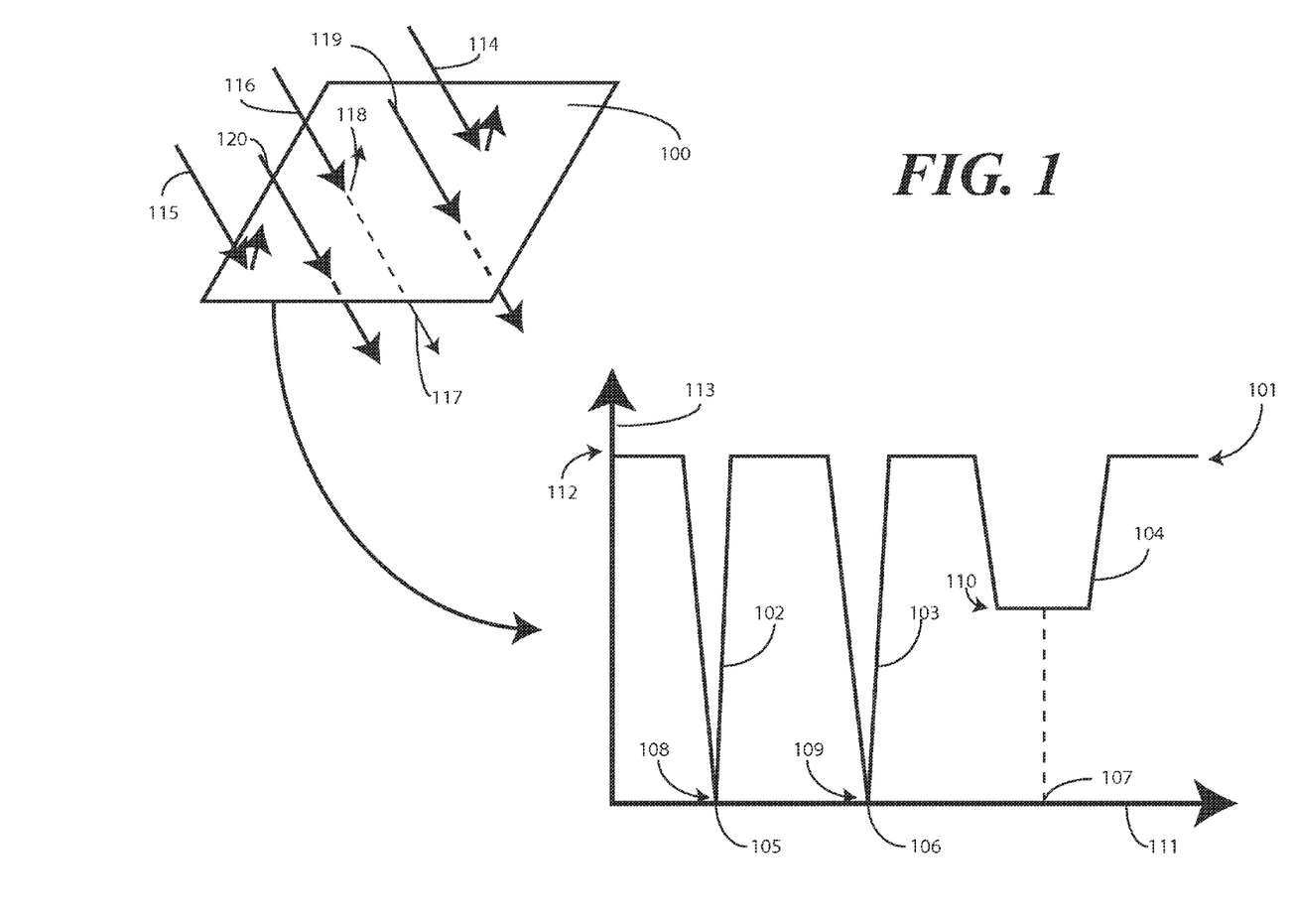
FIG. 1 illustrates one embodiment of a variable reflectivity notch filter and its corresponding transmission curve in accordance with embodiments of the invention

Turning now to FIG. 1, illustrated therein is one embodiment of a variable reflectivity notch filter 100 that is configured to selectively reflect light in accordance with embodiments of the invention. The variable reflectivity notch filter 100 defines a corresponding transmission curve 101, which is shown alongside the variable reflectivity notch filter 100. The transmission curve 101, which is a plot of the transmission of light through the variable reflectivity notch filter 100 as a function of wavelength, includes a plurality of reflective peaks 102,103,104. (Note that the reflective peaks appear as reflective notches in FIG. 1, as they are downward pointing.) Each of the reflective peaks 102,103,104 is centered about a predetermined wavelength 105,106,107 of light. Each reflective peak 102,103,104 defines a reflectivity 108,109,110 by the amount it descends toward the wavelength axis 111 from a level of full transmission 112 denoted on the transmission axis 113.

The variable reflectivity peak filter 100 may be manufactured from reflective layer comprising a thin coating of aluminum or other suitable metal having reflective properties corresponding to the transmission curve 101. The variable reflectivity peak filter 100 of embodiments of the present invention has is referred to as "variable" because it includes at least one reflectivity, e.g., reflectivity 110, that is different from other reflectivities 108,109 at various desired wavelengths, e.g., wavelength 107. In the illustrative embodiment of FIG. 1, reflectivity 110 is less than reflectivity 108 or reflectivity 109. It is well to note that the transmission curve 101 of FIG. 1, which has two reflectivities 108,109 that are substantially similar, and another reflectivity 110 that is substantially less and is associated with a reflective peak 104 that is substantially wider than the other reflective peaks 102,103, is illustrative only and is used for discussion purposes in explaining one embodiment. It will be clear to those of ordinary skill in the art having the benefit of this disclosure that embodiments of the invention are not so limited. For example, two of the reflective peaks 102,103,104 could be configured with reflectivities and widths different from a third, and so forth.

The reflective layer used for the variable reflectivity notch filter 100 may have a thickness configured to allow some light to be reflected and to also allow some light to be transmitted, in accordance with the transmission curve 101. In addition to metals such as aluminum, the reflective layer can also be manufactured from a thin film or laminated stack of dielectric materials. Additionally, a combination of dielectric materials and metals can be used. In such an arrangement, the reflective layer may be considered to be a broadband "partial" reflector.

In the illustrative embodiment of FIG. 1, the variable reflectivity notch filter 100 is configured for use with a laser-based projection system employing a red laser, a blue laser, and a green laser. Accordingly, the three predetermined wavelengths 105,106,107 of the transmission curve 101 are approximately 450 nm, 530 nm, and 750 nm, respectively. The reflectivity 108,109,110 associated with at least one of these predetermined wavelengths 105,106,107, in one embodiment, differs by at least twenty percent from the others. In one embodiment, the reflectivities 108,109 of predetermined wavelengths 105,106 are between fifty and one hundred percent, while the reflectivity 110 of predetermined wavelength 107 is between one and fifty percent.

Note that for simplicity of discussion, a scanning-type laser-based projection system will be used herein for discussion. In scanning-type systems, a pivotable gimbal or other similar device is responsive to a controller and moves a reflective surface to redirect light received from lasers to form an image. However, this type of laser projection source is but one type suitable for use with embodiments of the invention. It will be clear to those of ordinary skill in the art having the benefit of this disclosure that embodiments of the invention are not so limited. For example, other types of projection sources suitable for use with embodiments of the invention include microdisplay projection systems, such as those employing transmissive liquid crystal displays, liquid crystal on silicon displays, or digital light projection displays. Accordingly, it should be understood that these displays, or others, can be substituted for the scanned laser projection system herein to form additional embodiments of the invention.

Accordingly, green light 114 and blue light 115 are substantially reflected from the variable reflectivity notch filter 100, while red light 116 is only partially reflected. Some of the red light 116 passes through the variable reflectivity notch filter 100 as transmitted light 117, while some of the red light 116 is reflected from the variable reflectivity notch filter 100 as reflected light 118. Wavelengths other than those selected for reflection in the transmission curve 101, such as pink light 119 or orange light 120 are substantially transmitted through the variable reflectivity notch filter 100.

Figure 2:
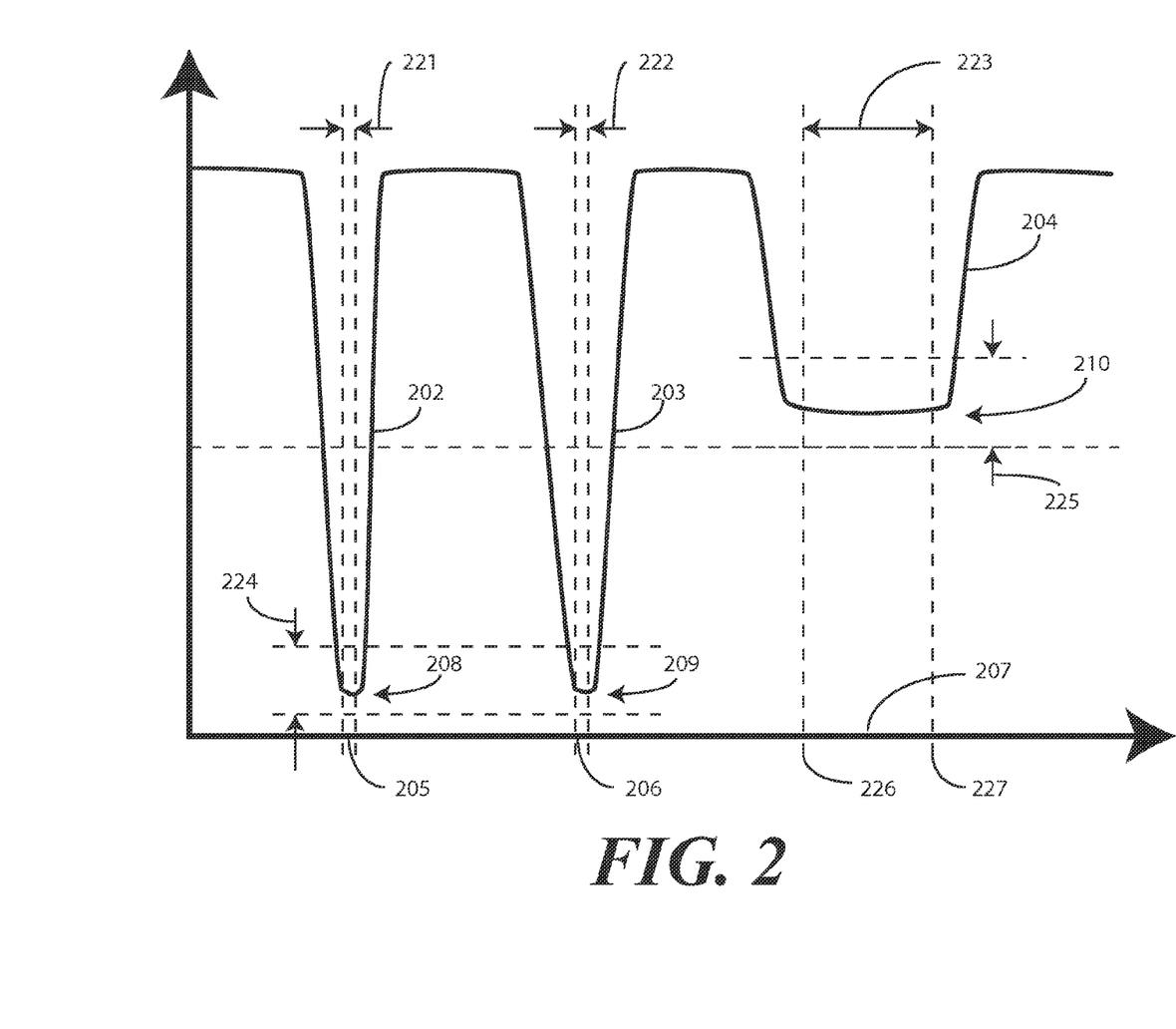
FIG. 2 illustrates one exemplary transmission curve suitable for use in automotive applications in accordance with embodiments of the invention.

Turning now to FIG. 2, illustrated therein is a transmission curve 201 that is well suited for automotive applications. As with FIG. 1, the transmission curve 201 of FIG. 2 defines a plurality of reflective peaks 203,204,205 that are centered about predetermined wavelengths 205,206,207 of light. Each reflective peak 203,204,205 has an associated reflectivity 208,209,210 associated therewith. Also, as with FIG. 1, the transmission curve 201 of FIG. 2 is intended for use with a projection source configured to emit red, green, and blue light.

As noted above, most systems and components for automotive applications must be configured to operate in a range of temperatures extending from −30 degrees centigrade to +85 degrees centigrade. Laser scanned systems can be designed to operate in this range, but may require warming elements and cooling elements where the operating range of laser sources is less than this range.

Experimental testing has shown that commonly available semiconductor lasers emitting blue or green light are relatively stable across a wide range of temperatures. For example, most green semiconductor lasers are frequency-doubled devices, and have outputs that are relatively stable at, for example, 530 nm. Similarly, blue lasers, such as those made from gallium-nitride have a center wavelength that moves on the order of 0.05 nm per degrees centigrade. However, red semiconductor lasers can exhibit a wide range of center-frequency variance with temperature. This is true because most red semiconductor lasers are manufactured with gallium arsenide (GaAs). The emitted wavelength of GaAs devices is dependent upon temperature and current. Consequently, some red semiconductor lasers can vary as much as 0.3 nm per degree centigrade. Even in a system with lasers equipped to operate from −10 degrees centigrade to +70 degrees centigrade, and that is equipped with warming and cooling devices so as to be operable from −30 degrees centigrade to +85 degrees centigrade, this can result in more than 15 nm of variance.

Accordingly, in the transmission curve 201 of FIG. 2, the reflective peak 202 associated with blue light and the reflective peak 203 associated with green light have widths 221,222 that are narrower than the width 223 of reflective peak 204. Accordingly, reflective peak 204 will reflect a wider range of wavelengths than will either reflective peak 202 or reflective peak 203. In the illustrative embodiment of FIG. 2, the width 223 of reflective peak 204 is at about three times greater than width 221 or width 222. Where predetermined wavelength 207 corresponds to red, the width 223 of reflective peak 204 is configured to be at least 20 nm wide in one embodiment so as to reflect red light across the automotive temperature range. Said differently, the maximum wavelength 227 of reflectivity will be at least 20 nanometers greater than the minimum wavelength 226 for reflective peak 204 in one embodiment. By contrast, width 221 and 222 can be configured to have corresponding widths 221,222 of about 5 to 6 nm. Note that these widths correspond to a specified range of −30 degrees centigrade to +85 degrees centigrade, which is a widely accepted automotive temperature performance specification.

In the illustrative embodiment of FIG. 2, the reflectivity 210 of the reflective peak 204 configured to reflect red light is less than the reflectivities 208,209 of the reflective peaks 202,203 that are configured to reflect blue light and green light, respectively. Reflectivity 210 has a range 225 of between thirty and sixty percent, and is shown illustratively as being about forty-five percent. Reflectivities 208,209 have a range of between seventy and ninety five percent, and are shown as being illustratively about eighty percent.

Figure 3:
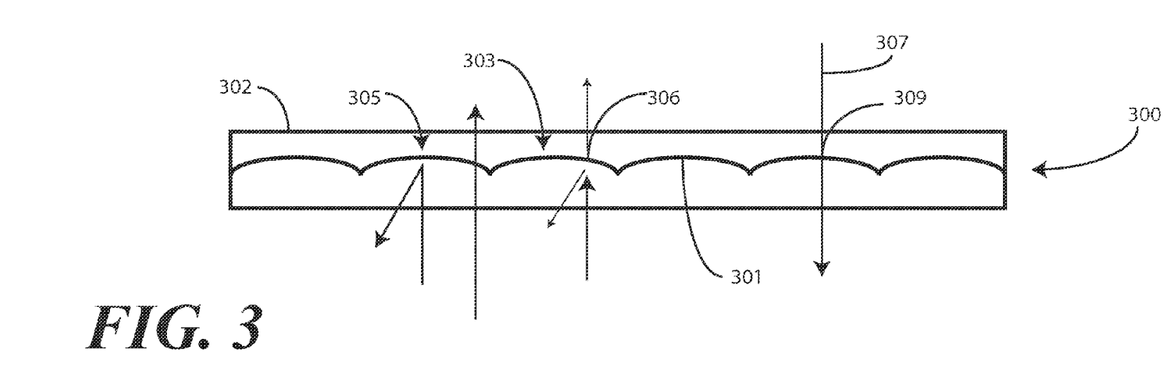
FIG. 3 illustrates one embodiment of a projection surface suitable for use with laser projection systems in accordance with embodiments of the invention.

Turning now to FIG. 3, illustrated therein is an optical device 300 configured for use as a projection surface in accordance with one or more embodiments of the invention. The optical device 300 includes reflective layer 301 comprising a variable reflectivity notch filter integrated with a body 302. Accordingly, the reflective layer 301 an associated transmission curve comprising a plurality of reflective peaks centered about predetermined wavelengths of light, with each reflective peak having an associated reflectivity, wherein a reflectivity of at least one peak is different from a reflectivity of at least another peak. Thus, where configured in accordance with the transmission curve (201) of FIG. 2, the reflective layer 301 is configured to substantially reflect 305 blue and green light, while partially reflecting 306 red light due to the respectively different reflectivities. Light 307 having other wavelengths is permitted to pass through the reflective layer 301. The body 302 is configured as an envelope disposed about the reflective layer 301.

In the illustrative embodiment of FIG. 3, the reflective layer 301 is integrated with an exit pupil expander 303. Construction thereof may be completed by affixing the reflective layer 301 to the exit pupil expander 303. In one embodiment, the reflective layer 301 is applied directly on the surface of the exit pupil expander 303. Optical filler materials or epoxy can then be used to couple a cover plate to the reflective layer 301. In one embodiment, the reflective index of the substrate, the exit pupil expander 303, the epoxy, and the cover plate are very similar. The refractive index of the reflective layer 301 is substantially different for the laser colors.

As will be described below, the exit pupil expander can be configured as one or more of a micro lens array, microspheres, nanospheres, a diffuser, or a diffraction grating. The exit pupil expander 303 is shown illustratively in FIG. 3 has being formed from a series of microspheres, which give the reflective layer 301 its wave-like shape.

The exit pupil expander 303 is configured, in one embodiment, to expand reflected light. For example, the exit pupil expander 303 can have optical properties resulting from a selected pitch, radius, or spacing of its constituent parts that work to expand incident light when reflected. Further, the exit pupil expander 303 may include various holographic elements, a diffractive grating, or other optical elements capable of optically expanding reflected light rays 320 to result in a controlled angle of reflection or interference pattern. In another embodiment, the reflective layer 301 may also include a polarization dependent reflector in which incident light having a first polarity is reflected as expanded light rays, and incident light having a second polarity is transmitted.

In the illustrative embodiment of FIG. 3, the exit pupil expander 303 and the body 302 have substantially similar coefficients of refraction. In one embodiment, sides of the body envelope on either side of the exit pupil expander 303 have relatively high refractive indices that are substantially similar to the refractive index of the exit pupil expander. As the ambient air outside the body 302 has a relatively low index of refraction, this configuration permits rays transmitted through the reflective layer 301 to pass through without being significantly affected or distorted. Further the angle at which light rays leave the optical device 300 is the same, or nearly the same, as the angle at which they enter. These refraction properties permit reflection of some light with expansion, and transmission of other light without expansion.

Figure 4:
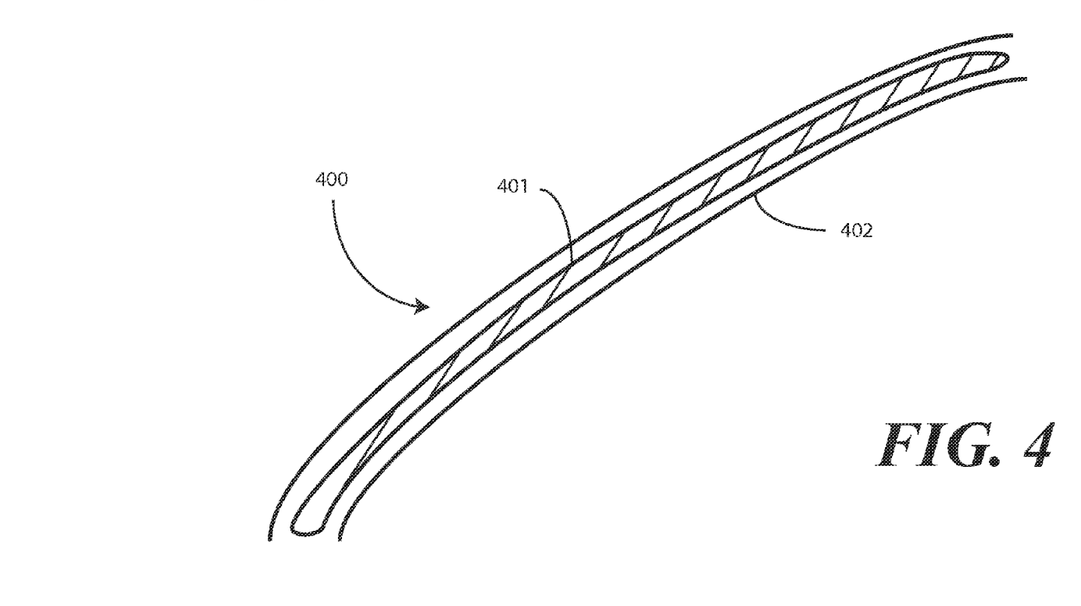
FIG. 4 illustrates one embodiment of a numerical aperture expander, shown illustratively as being embedded in a windshield or the like in accordance with embodiments of the invention.

Turning now to FIG. 4, illustrated therein is another optical device 400 configured in accordance with embodiments of the invention. In FIG. 4, the optical device 400 comprises a windshield 402 having a display surface 401 integrated therein. The display surface 401 comprises an exit pupil expander integrated with a variable reflectivity notch filter as previously described.

In FIG. 4, the windshield 402 is configured as an envelope disposed about the exit pupil expander. As with FIG. 3, the envelope and the exit pupil expander have substantially similar coefficients of refraction such that the predetermined wavelengths of light are at least partially reflected in accordance with the transmission curve of the variable reflectivity notch filter. In one embodiment, the transmission curve is configured such that the colors of a corresponding laser source are reflected, while other wavelengths are transmitted.

The variable reflectivity notch filter has at least one reflectivity that is less than others. Accordingly, at least some wavelengths of light will be reflected less than others. The reflected light is then expanded to a larger output numerical aperture by the exit pupil expander. Accordingly, the exit pupil expander of this embodiment can be referred to as a "numerical aperture expander." Said differently, the exit pupil expander transforms the essentially collimated rays received from a laser source into angularly distributed rays that can be seen from a wide range of angles. When using other projection systems, the light may be non-collimated or less collimated than in some scanned systems. Regardless, the inclusion of an exit pupil expander is still advantageous as the exit pupil expander still works to "spread" reflected light so that the projection surface does not act as a flat mirror reflecting light in accordance with an angle of incidence without distribution. Wavelengths other than those selected for reflection or partial reflection by the transmission curve are transmitted without substantial distortion through the variable reflectivity notch filter. In one embodiment, the reflective peak having the lesser reflectivity also has a wider width as previously described so as to provide reliable performance across a wide range of temperatures.

Figure 5:
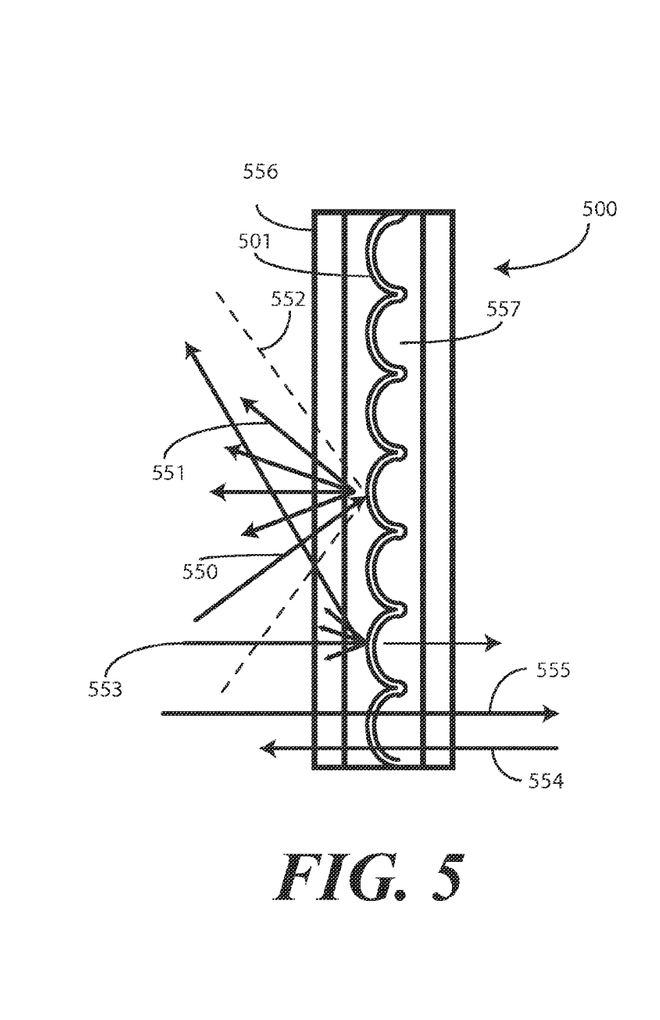
FIG. 5 illustrates an exemplary head-up display in accordance with embodiments of the invention.
Figure 6:
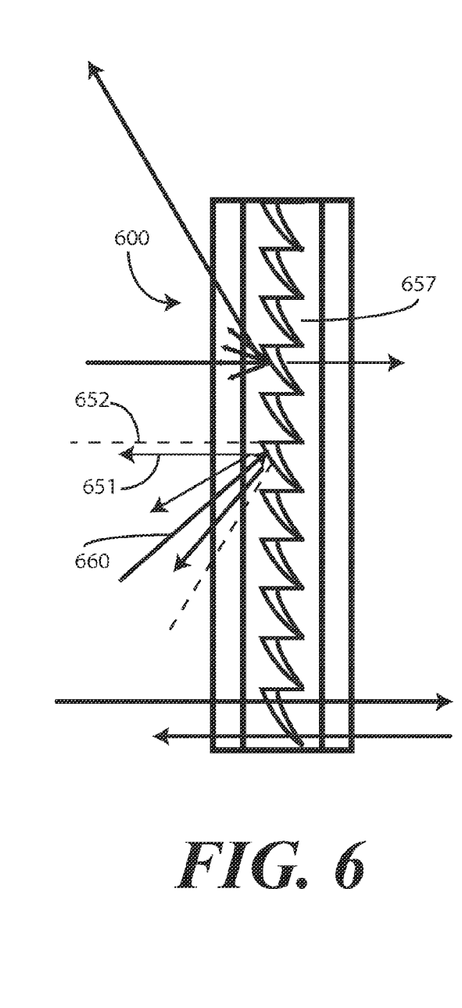
FIG. 6 illustrates another embodiment of an aperture expander in accordance with embodiments of the invention.

Turning now to FIGS. 5 and 6, illustrated therein are sectional views of optical devices including variable reflectivity notch filters and exit pupil expanders configured in accordance with embodiments of the invention. Turning first to FIG. 5, illustrated therein is one embodiment of an optical device 500 suitable for use with a laser projection source as a display surface in accordance with embodiments of the invention.

In one embodiment, the optical device 500 can be constructed to substantially reflect certain incident light rays 550 in accordance with a transmission curve. For example, in one embodiment the incident light rays 550 can comprise blue or green light. The resulting reflected light rays 551 may be expanded to a desired output expansion cone 552 to provide a larger field of view of a reflected image to a viewer. This expansion of reflected light rays 551 may be referred to as "numerical aperture" expansion.

The optical device 500 can also be configured to partially reflect incident light rays 553 as described above. For example, where the optical device 500 is configured in a vehicle as a display surface for a head-up display, the optical device 500 can be configured to partially reflect red light across a wide range of temperatures by defining the reflective peak corresponding to the red light to have a lesser reflectivity than blue or green, and to have a wider width so as to partially reflect a broader range of wavelengths.

The optical device 500 can also be constructed to allow certain light rays 554 and 555 to be transmitted, at least in part. Such light rays 544,555 therefore travel through either side of the variable reflectivity notch filter integrated within the optical device. Accordingly, the optical device 500 has both reflective and transmissive properties, which are defined by the transmission curve. This configuration works well in automotive applications, such as windshields, where it can be desirable to display an image from a corresponding image projection source on optical device 500 while still allowing the optical device 500 to be at least partially transparent so as to allow a user to see through the optical device while simultaneously viewing the displayed image.

In one embodiment, the optical device includes a first layer 556 that is light transmissive. The first layer 556 can be glass, plastic, Mylar, or another similar material and can be rigid or be flexible. Flexibility allows the optical device 500 to be curved or manipulated to a desired shape or curvature.

An exit pupil expander 557, which may be either an ordered array of microstructures or a randomized light diffuser, is disposed adjacent to first layer 556. The exit pupil expander 557 can be, for example, a micro lens array (MLA). The exit pupil expander 557 can be manufactured from a molded liquid polymer, or may be formed via other methods. In one embodiment the exit pupil expander 557 may be embossed on first layer 556 by a roll embossing process. In another embodiment, the exit pupil expander 557 may comprise glass or plastic beads, or microspheres or nanospheres, or similarly shaped objects capable of functioning as an optical diffuser or lens. As noted above, the exit pupil expander 557 may have optical properties resulting from a selected pitch, radius, or spacing of its constituent parts to expand incident light that is reflected. Further, the exit pupil expander 557 may include various holographic elements, a diffractive grating, or other optical elements capable of optically expanding reflected light rays 551 to result in a controlled angle of reflection or interference pattern.

In one embodiment, a variable reflectivity notch filter 501 may be disposed on the exit pupil expander 557 to impart selective reflective properties in accordance with a transmission curve in which one or more reflective peaks are wider, and have less reflectivity than, other reflective peaks to facilitate vibrant reflection across a range of temperatures despite center wavelengths of some laser sources moving in the range of temperature. As noted above, the variable reflectivity notch filter 501 may comprise a thin coating having reflective properties at desired wavelengths so as to allow some light to be substantially reflected, some light to be partially reflected, and some light to be substantially transmitted.

As noted above, in one embodiment, the variable reflectivity notch filter 501 may comprise a polarization dependent reflector in which incident light having a first polarity is reflected as expanded light rays while incident light having a second polarity is transmitted. The transmission curve can thus be configured as a function of polarization as well as wavelength.

As an extension, in one embodiment the variable reflectivity notch filter 501 may comprise a first polarization material in a first region along the optical device 500 to reflect light having a first polarity in the first region, and may comprise a second polarization material in a second region of the optical device 500 to reflect light having a second polarity in the second region. This configuration facilitates a single optical device 500 that can serve as dual or multiple displays. Similarly, multiple reflection selectivity may be provided using one or more color filters for the variable reflectivity notch filter 501. Thus, the variable reflectivity notch filter 501 may comprise one or more broadband reflectors, polarized coatings, and/or narrowband coatings, or combinations thereof.

Turning now to FIG. 6, illustrated therein is a cross sectional view of an alternate embodiment of an optical device 600 configured with embodiments of the invention. The optical device 600 of FIG. 6 is similar to that of FIG. 5 in that it includes a variable reflectivity notch filter 601, which in one embodiment is configured to partially reflect red light across a wide range of temperatures by defining the reflective peak corresponding to the red light to have a lesser reflectivity than blue or green, and to have a wider width so as to partially reflect a broader range of wavelengths. The optical device 600 of FIG. 6 differs from that of FIG. 5 in that it includes an asymmetrical exit pupil expander that is coupled with a variable reflectivity notch filter.

The optical device 600 as shown in FIG. 6 is substantially similar to the optical device (500) shown in FIG. 5, with a few differences. The exit pupil expander 657 of FIG. 6 is designed to have an asymmetrical structure so that reflected light rays 651 are directed in a desired direction according to the structures of the exit pupil expander 657. For example, the exit pupil expander 657 may have an asymmetrical structure to cause reflected light rays 651 to have a directional bias from the angle of reflection that would not otherwise occur if exit pupil expander 657 were symmetrical.

In the illustrative embodiment of FIG. 6, the exit pupil expander 657 has an asymmetry to bias reflected light rays 651 downward, which results in the output expansion cone 652 to also be directed downward. Alternatively, the exit pupil expander 657 may have an asymmetry to bias reflected light rays 651 upward. Such an asymmetrical structure may be utilized to direct the output expansion cone 652 to a desired location according to the particular application. For example, in an automotive head-up display application, the optical device 600 may be configured as a windshield, which may be positioned at a predefined angle relative to a viewer. Thus, the exit pupil expander 657 may be designed to have an appropriate asymmetry to direct the output expansion cone 652 to the eye of the driver so that the driver may view images projected by a display along light ray 660.

It is well to note that the "asymmetricalness" of the elements of the exit pupil expander 657 may vary from element to element. For example, the asymmetry of the elements located toward the ends of the exit pupil expander 657 may have more asymmetry than elements located toward the center of the exit pupil expander 657. Additionally, centrally located elements may have very little or no asymmetry. Such varying asymmetry directed toward the center of the exit pupil expander 657 may be utilized to result in a smaller, narrower output expansion cone. Varying asymmetry directed away from the center of the exit pupil expander 657 may result in a larger, wider output expansion cone.

Figure 7:
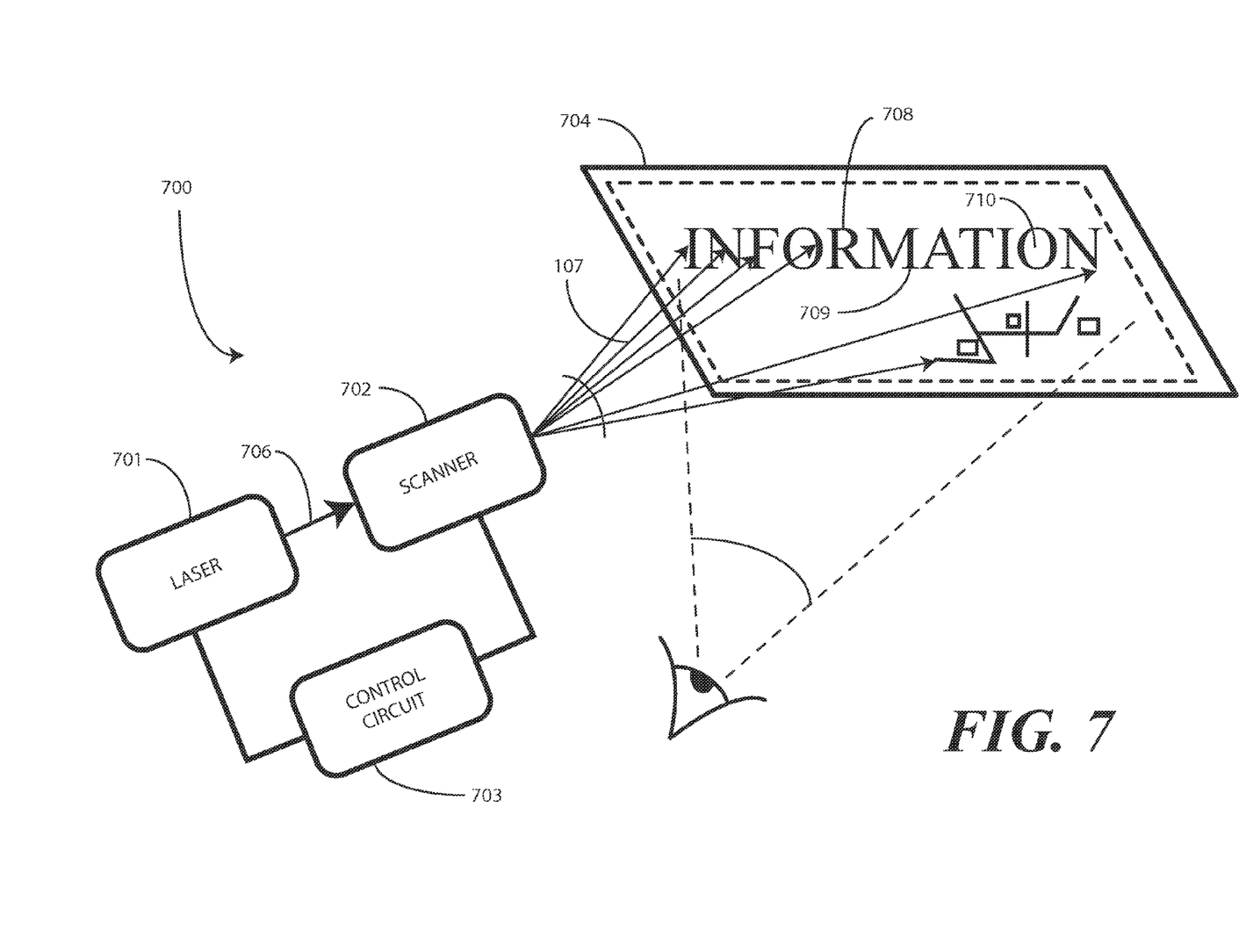
FIG. 7 illustrates one projection system in accordance with embodiments of the invention.

Turning now to FIG. 7, illustrated therein is one embodiment of an image projection system 700 that includes a display 704 that is at least partially transmissive and partially reflective due to the use of a variable reflectivity notch filter in accordance with embodiments of the invention. The image projection system 700 is suitable for use as a head-up display in automotive applications, although other applications will be obvious to those of ordinary skill in the art having the benefit of this disclosure. The image projection system 700 includes a laser projection source 701, a scanner 702, a control circuit 703, and a display 704 that includes a variable reflectivity notch filter as previously described. As noted above, the projection source 701 can be a scanned projection source, but also can be other types of systems as well, including microdisplays, liquid crystal on silicon systems, digital light projection systems, and so forth. In one embodiment, the display also includes an exit pupil expander as well. Where included, the exit pupil expander is configured to expand the predetermined wavelengths of light that are reflected in accordance with the transmission curve of the variable reflectivity notch filter.

The laser projection source 701, in one embodiment, comprises multiple lasers. Each laser is configured to emit a predetermined wavelength of light. The transmission curve of the variable reflectivity notch filter is configured to reflect these predetermined wavelengths across a range of temperatures. For example, in one embodiment the laser projection source 701 includes a red laser, a blue laser, and a green laser, with one or more of the laser sources having an output wavelength that varies with temperature. For those output wavelengths, corresponding reflective peaks of the transmission curve will be sufficiently wide to reflect across the entire range of temperatures. So as not to make transmitted light look matte or grainy, the reflectivities of those reflective peaks will be less than other reflectivities of other reflective peaks. The lasers used in the laser projection source 701 can be of various types. For example, for compact designs, semiconductor-based lasers can be used, including edge emitting lasers or vertical cavity surface emitting lasers. In other applications, larger, more powerful lasers can be used, alone or in combination.

The laser projection source 701 delivers light 706 from the laser sources to the scanner 702. The scanner 702 is configured to receive the light 706 and deliver scanned light 707 to the display 704 to form a projected image 708. The control circuit 703, which may be a microprocessor or other programmable device, executes embedded instructions to control the scanner 702. In one embodiment, the control circuit 703 is configured to increase the optical efficiency of the image projection system 700 by selectively scanning information of the projected image 708. For example, it is often the case that the projected image 708 will include informational portions 709 and non-informational portions 710. While a raster-scanned system would scan the entire projection surface, one or more embodiments of the present invention scan only the informational portions 709, thereby increasing efficiency.

Figure 8:
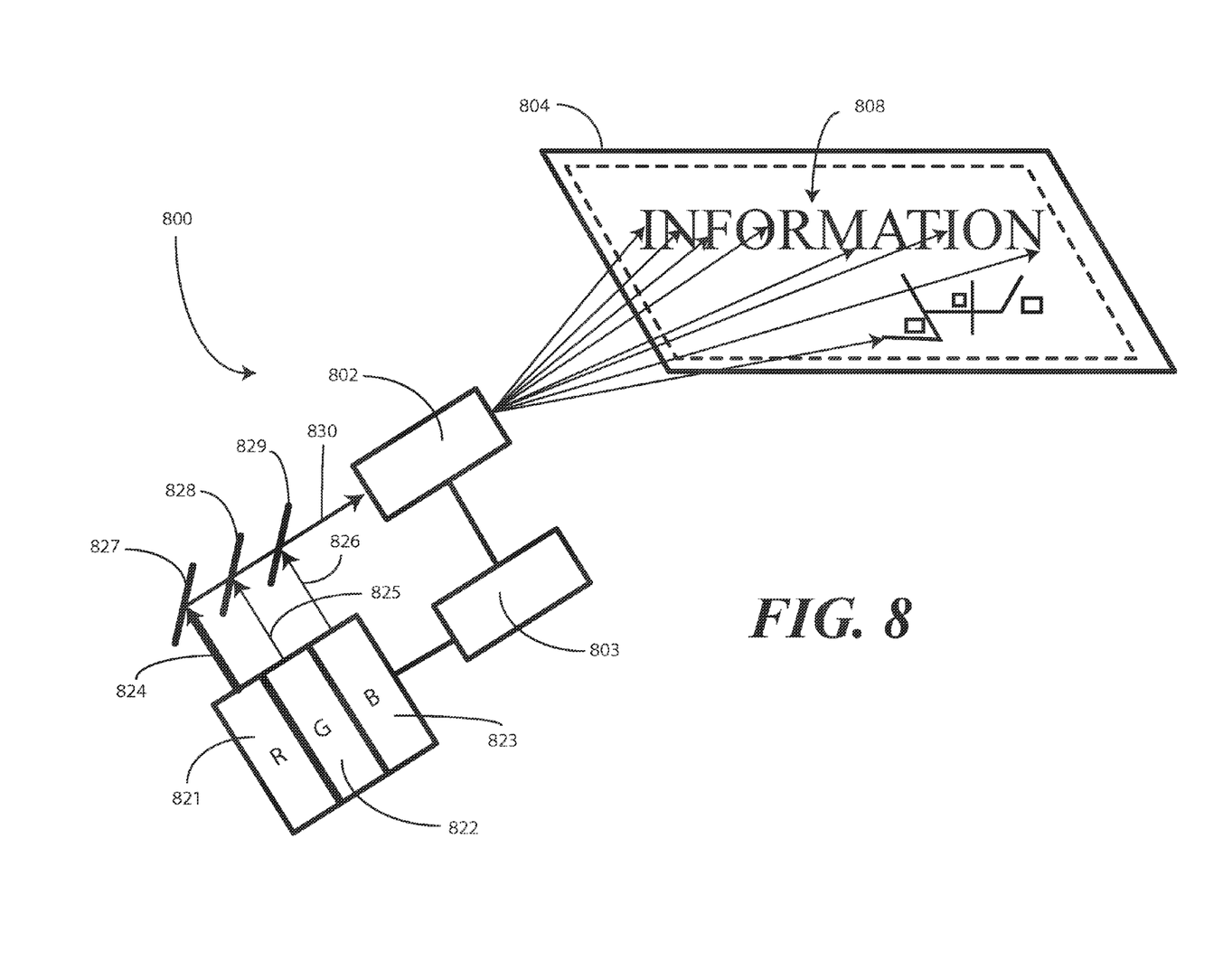
FIG. 8 illustrates another projection system in accordance with embodiments of the invention.

Turning now to FIG. 8, illustrated therein is another image projection system 800 configured in accordance with embodiments of the invention. The image projection system 800 of FIG. 8 employs a red laser 821, a green laser 822, and a blue laser 823, each being configured to emit a predetermined wavelength or frequency of light. One or more of the lasers 821,822,823 has a frequency or wavelength that changes as a function of temperature. For illustration purposes, the red laser 821 will be described as varying with temperature, although other lasers or multiple lasers may exhibit the same phenomenon.

As shown in FIG. 8, the plurality of lasers 821,822,823 produces a plurality of light beams 824,825,826. As noted above, in the transmission curve of the variable reflectivity notch filter, one or more of the reflectivity notches will have a reflectivity that is wider and less than other reflective peaks. In this illustrative embodiment, the reflectivity notch corresponding to the red laser 821 is shallower and wider than are the reflectivity notches corresponding to the green laser 822 and blue laser 823. This is because the predetermined wavelength of the red laser 821 changes as a function of temperature across a predefined range from a minimum wavelength to a maximum wavelength, and the reflective peak corresponding to the red laser is configured such that red light is at least partially reflected across a range including the minimum wavelength and the maximum wavelength.

Since the reflectivity is lower, in one embodiment the output power of the red laser 821 is increased so that the corresponding image 808 has the proper brightness. Said differently, since the reflectivity peak corresponding to the red laser 821 is lower than that for the blue laser 823 or green laser 822, the red laser 821 is configured to emit more red light 824 than are the green laser 822 or blue laser 823. The output power is increased such that the red light 824 is reflected from the variable reflectivity notch filter with substantially the same luminous intensity as the green light 825 and blue light 826 to ensure that the resulting image 808 has the proper color and brightness balance.

There are multiple ways of increasing the amount of red light with respect to the amounts of blue and green light. For example, one way is to simply increase the output of the red laser 821 while leaving the outputs of the blue laser 823 and green laser 822 unchanged. An alternative is to reconfigure the design of the overall optical system such that relatively more red light is transmitted than green and blue. In prior art systems, the transmission of all three colors is substantially balanced. However, in one embodiment of the present invention, the system is configured to produce more red light.

In one embodiment, this occurs by driving the red laser 821 with a higher current. For example, if the reflectivity peak corresponding to the red laser 821 is half that for the green laser 822, the red laser 821 may be driven with about twice as much current due to the inverse relationship of output power and reflectivity to ensure that the resulting image 808 corresponds to the image data upon which the image 808 is based.

Optional optical alignment devices 827,828,829 are then used to orient the plurality of light beams 824,825,826 into a combined light beam 830. In one embodiment, dichroic mirrors can be used as optical alignment devices 827,828,829. Dichroic mirrors are partially reflective mirrors that include dichroic filters that selectively pass light in a narrow bandwidth while reflecting others.

The scanner 802, which may be responsive to the control circuit 803, then produces the projected images on the display 804, which includes the variable reflectivity notch filter. In one embodiment, the scanner 802 includes a microelectromechanical (MEMS) scanning mirror, such as those manufactured by Microvision, Inc. of Redmond, Wash. Examples of MEMS scanning mirrors, such as those suitable for use with embodiments of the present invention, are set forth in commonly assigned, copending U.S. patent application Ser. No. 11/786,423, filed Apr. 10, 2007, entitled, "Integrated Photonics Module and Devices Using Integrated Photonics Module," which is incorporated herein by reference, and in U.S. Pub. patent application Ser. No. 10/984,327, filed Nov. 9, 2004, entitled "MEMS Device Having Simplified Drive," which is incorporated herein by reference. A MEMS scanning mirror is well suited to embodiments of the invention due to its compact construction, cost effectiveness, and reliability. While a MEMS device will be used herein for discussion purposes, it will be clear to those of ordinary skill in the art having the benefit of the disclosure that other scanning platforms, such as microdisplay projection systems, may be used as well.

Figure 9:
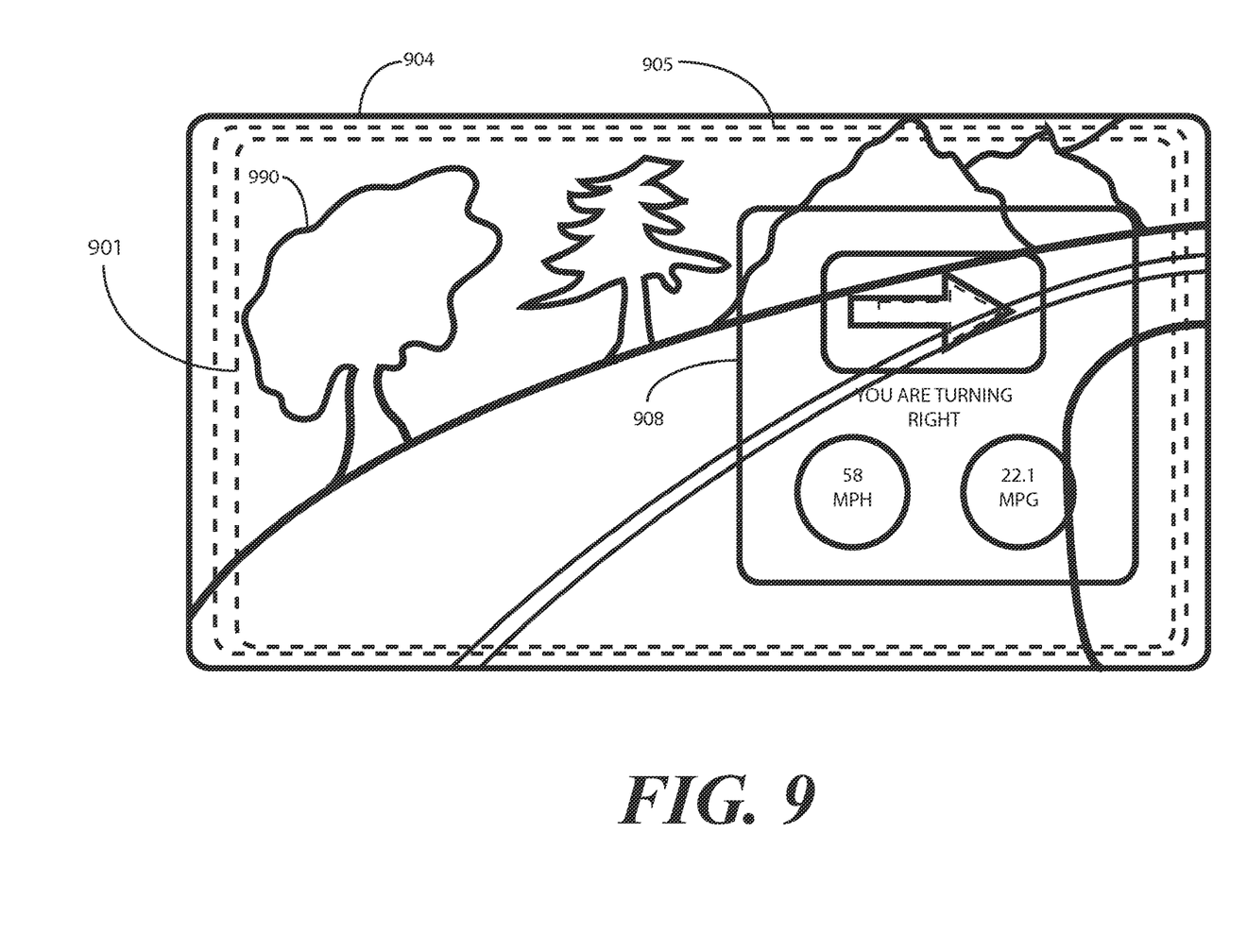
FIG. 9 illustrates an exemplary head-up display in accordance with embodiments of the invention.

Referring now to FIG. 9, illustrated therein is a side elevation view of a display 904 incorporating a variable reflectivity notch filter 901 and an optional numerical aperture expander 905 in accordance with embodiments of the invention. A projected image 908, such as that created by the laser sources shown in FIGS. 7 and 8, is presented thereon. This projected image 908 is but one example of an image that may be formed with a scanned laser source as described herein. In the illustrative embodiment of FIG. 9, the display 904 has been configured as the windshield of a vehicle in motion. Alternatively, the variable reflectivity notch filter 901 may cooperate with a separate windshield, rather than being embedded therein. The latter embodiment is well suited in for installation as an after market component.

In the illustrative embodiment of FIG. 9, the variable reflectivity notch filter 901 is configured to substantially reflect or partially laser wavelengths in accordance with a transmission curve, while transmitting non-laser wavelengths. The projected image 908 is a reflection of visible light generated by the laser projection source and scanned along the variable reflectivity notch filter 901. In one embodiment, the projected image 908 appears to the viewer to be in the plane of the windshield or display 904. Note that as this term used, the "plane of the projection surface" can be flat or non-flat, and is defined by the geometric shape of the display 904. When the image appears in the "plane of the projection surface," it would appear closer than would an object 990 being viewed beyond the display 904.

Figure 10:
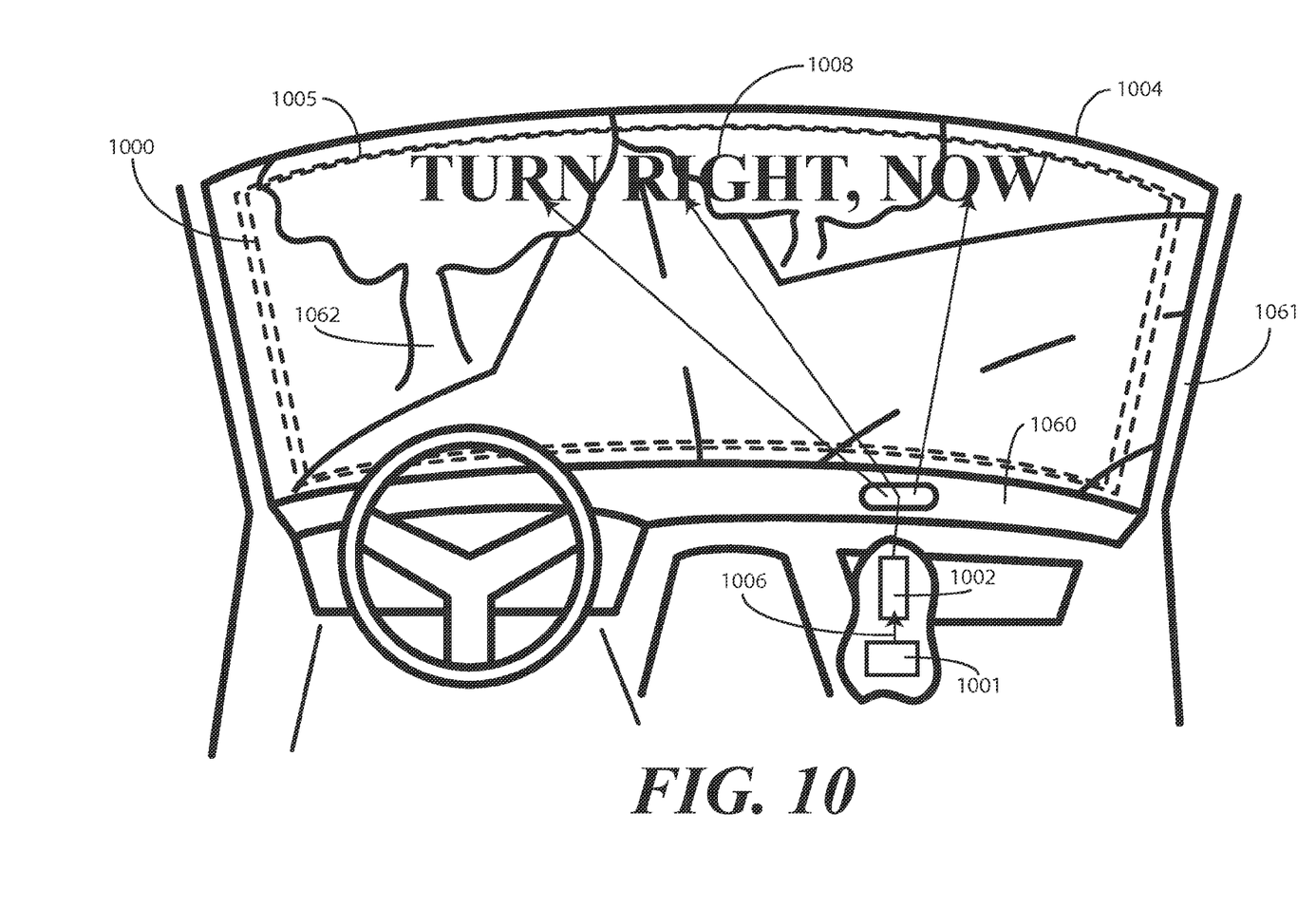
FIG. 10 illustrates one application for a projection system in accordance with embodiments of the invention.

Turning now to FIG. 10, illustrated therein is an automotive application for an image projection system employing a variable reflectivity notch filter configured in accordance with embodiments of the invention. The application of FIG. 10 is that of a head-up display in an automobile. The application of FIG. 10 is intended to be illustrative only, as other applications are also suitable for embodiments of the invention, including near-to-eye displays and head-up displays in non-automotive applications.

As shown in FIG. 10, a scanned laser projection source 1001 delivers light 1006 to a two-axis vector scanner 1002. As shown in FIG. 10, both the scanned laser projection source 1001 and the scanner 1002 are embedded in the dashboard of a vehicle. This can be accomplished due to the wide scan angle delivered by the scanner 1002. Note also that the scanned laser projection source 1001 can be configured as a separate component, such as in aftermarket head-up displays where the projector is either installed on the dashboard or is attached to the head-liner if the vehicle.

Despite being located in very close proximity with the windshield 1004, which includes the variable reflectivity notch filter 1000 and serves as the projection surface, the scanner 1002 can address substantially all of the windshield 1004, thereby giving the driver a broad field of view for a projected image presented on the windshield 1004. While this is one location, the scanned laser projection source 1001 and the scanner 1002 could be mounted to the roof or windshield sidebar 1061 as well. The scanned laser projection source 1001 and scanner 1002 can be mounted together or separately.

The scanner 1002 is configured to selectively deflect light along the windshield 1004 so as to form a projected image 1008 by reflecting off the embedded variable reflectivity notch filter 1000. In one embodiment, the power of laser sources that correspond to reflective peaks having lesser reflectivity is increased to maintain a uniform image. The windshield 1004 may additionally include an aperture expander 1005. The aperture expander 1005 works with the variable reflectivity notch filter to permit a viewer to view the projected image 1008 on an otherwise translucent surface.

Note that while the windshield 1004 is described as being "otherwise translucent," it could also be semi-transparent over a limited angular range. For example, in one or more embodiments, the projection systems described herein can be integrated, for example, in a dash board and configured to reflect images directly off the windshield 1004. Such systems employ an aperture expander, but embed the aperture expander embedded in the projection system rather than the windshield 1004. In such embodiments, the windshield 1004 can be uncoated. However, the light delivered to the windshield 1004 may arrive at steep angles so that the amount of light reflected is around thirty percent. For light impinging at shallower angles, i.e., normal incidence, the windshield 1004 can appear to be fully transparent. It is well to note that at steeper angles of incidence can be used when a variable reflectivity notch filter 1000 as described herein.

Some of the light from the scanned laser projection source 1001 is substantially reflected in accordance with the variable reflectivity notch filter's transmission curve. Other light is partially reflected in accordance with reflective peaks of the transmission curve having lesser reflectivities to accommodate wavelength changes that occur with temperature, while other light is transmitted, thereby permitting the driver to view objects 1062 through the windshield 1004. The reflected light can be expanded into a larger output numerical aperture via the aperture expander 1005.

In the illustrative embodiment of FIG. 10, the projection system is serving as a navigation device. The projected image 1008 is step-by-step directions for the driver to get to a particular location. For example, one step—TURN RIGHT—is shown in large letters on the windshield 1004. The driver is thereby able to read the large directions without being distracted from other objects 1062 on the road.

As has been described herein, in laser projection systems the wavelength of semiconductor lasers changes with temperature. While the wavelengths of any of the sources can change, experimental testing has shown that the red laser tends to vary more than green or blue—in a RGB system—across temperature. This is due to the fact that red lasers are based on GaAs materials that have a large band gap shift with temperature. The net result is a large wavelength that can cause the reflective coatings used in head-up displays to be undesirably difficult to see through.

Embodiments of the present invention employ a variable reflectivity notch filter that is configured to selectively reflect light. The variable reflectivity notch filter defines a transmission curve comprising a plurality of reflective peaks centered about predetermined wavelengths of light corresponding to the output wavelengths of the laser sources, with each reflective peak having an associated reflectivity. One or more of the reflective peaks, which is associated with a laser source that exhibits a large wavelength shift across temperature, has a different, lesser reflectivity. Further, one or more reflective peaks having lesser reflectivities are configured to be wider so as to partially reflect light from the laser source exhibiting wavelength shift across temperature. It should be noted that the variable reflectivity notch filters described herein are relatively stable across temperature. Accordingly, the transmission curve remains relatively constant across temperature as well.

The variable reflectivity notch filters described herein ensure that light from lasers exhibiting large wavelength changes across temperature are adequately reflected without restricting visibility through the filter. To provide enhanced color performance, in one embodiment the output power of lasers exhibiting wavelength shift across temperature is increased in an amount that is inversely related to the reduction in reflectivity of corresponding reflective peaks so as to provide images that appear natural.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An image projection system having a display that is at least partially transmissive and partially reflective, the image projection system comprising:
    a laser projection source having a controller configured to direct laser light to form an image on a display surface; and
    a reflective layer integrated with the display surface, wherein the reflective layer comprises a variable reflectivity notch filter defining a transmission curve comprising a plurality of reflective peaks centered about predetermined wavelengths of light, each reflective peak having an associated reflectivity, wherein a reflectivity of at least one peak is different from a reflectivity of at least another peak, wherein the laser projection source comprises a plurality of laser sources each configured to emit light centered at a predetermined wavelength, wherein the predetermined wavelength changes as a function of temperature across a predefined range from a minimum wavelength to a maximum wavelength, wherein the plurality of reflective peaks are configured to at least partially reflect the minimum wavelength and the maximum wavelength.

2. The image projection system of claim 1, wherein:

the predefined range spans at least between −30 degrees centigrade to +85 degrees centigrade;

the plurality of laser sources comprise at least a red laser source; and one maximum wavelength is at least 20 nanometers greater than a corresponding minimum wavelength.

3. The image projection system of claim 1, wherein the reflective peak configured to reflect red light has a reflectivity of between one and fifty percent, wherein another reflective peak configured to reflect one of blue light or green light has a reflectivity of between fifty and one hundred percent.

4. The image projection system of claim 3, wherein the reflective peak has a peak width twice the another reflective peak.

5. The image projection system of claim 3, wherein the plurality of laser sources comprise at least a red laser and at least another laser, wherein the at least the red laser is configured to emit more light than the at least another laser such that light from the red laser reflected from the reflective layer and light from the at least another laser reflected from the reflective layer have substantially similar luminous intensities.

6. The image projection system of claim 1, wherein the plurality of laser sources comprise at least a red laser and at least another laser, wherein the at least the red laser is driven with a higher current than the at least another laser so as to emit more light than the at least another laser.

* * * * *